(12) United States Patent
Fukao et al.

(10) Patent No.: US 9,090,303 B2
(45) Date of Patent: Jul. 28, 2015

(54) BICYCLE CONTROL DEVICE

(75) Inventors: Kazutaka Fukao, Sakai (JP); Tatsuya Matsushita, Sakai (JP); Makoto Yoshikawa, Sakai (JP)

(73) Assignee: Shimano Inc., Osaka (JP)

( * ) Notice: Subject to any disclaimer, the term of this patent is extended or adjusted under 35 U.S.C. 154(b) by 226 days.

(21) Appl. No.: 13/475,033

(22) Filed: May 18, 2012

(65) Prior Publication Data

US 2013/0305872 A1 Nov. 21, 2013

(51) Int. Cl.
*B62M 25/04* (2006.01)
*B62L 3/02* (2006.01)
*B62K 23/06* (2006.01)
*B62M 25/08* (2006.01)

(52) U.S. Cl.
CPC . *B62K 23/06* (2013.01); *B62L 3/02* (2013.01); *B62M 25/04* (2013.01); *B62M 25/08* (2013.01); *Y10T 74/20396* (2015.01); *Y10T 74/20438* (2015.01)

(58) Field of Classification Search
CPC ............ Y10T 4/20037; Y10T 4/20287; Y10T 4/2042; Y10T 4/20438
USPC ................. 74/473.14, 489, 501.6, 502.2, 525
See application file for complete search history.

(56) References Cited

U.S. PATENT DOCUMENTS

| | | | | |
|---|---|---|---|---|
| 4,002,350 | A | * | 1/1977 | Timbs ........................ 280/236 |
| 4,974,469 | A | * | 12/1990 | Romano ..................... 74/502.2 |
| 5,257,683 | A | | 11/1993 | Romano |
| 5,400,675 | A | | 3/1995 | Nagano |
| 5,653,649 | A | | 8/1997 | Watarai |
| 6,015,036 | A | | 1/2000 | Fukuda |
| 6,047,611 | A | * | 4/2000 | Warren et al. .................. 74/489 |
| 7,350,436 | B2 | | 4/2008 | Fujii |
| 7,665,384 | B2 | | 2/2010 | Sato et al. |
| 7,874,229 | B2 | | 1/2011 | Tetsuka |
| 7,950,307 | B2 | | 5/2011 | Miki |
| 2007/0012137 | A1 | | 1/2007 | Dal Pra' |
| 2007/0137388 | A1 | | 6/2007 | Dal Pra' |
| 2008/0098848 | A1 | * | 5/2008 | Dal Pra' et al. .............. 74/502.2 |
| 2008/0229863 | A1 | * | 9/2008 | Orrico et al. .................... 74/491 |

FOREIGN PATENT DOCUMENTS

| | | |
|---|---|---|
| CN | 101190706 B | 6/2010 |
| TW | 200902376 A | 1/2009 |
| TW | 201121832 A | 7/2011 |
| TW | 201208937 A | 3/2012 |

* cited by examiner

*Primary Examiner* — Thomas Diaz

(74) *Attorney, Agent, or Firm* — Global IP Counselors

(57) ABSTRACT

A bicycle control device is provided with a mounting bracket, a first lever and an adjustment arrangement. The first lever is pivotally arranged relative to the mounting bracket about a first-axis and about a second axis being non-parallel to the first axis. The first lever is configured relative to the mounting bracket such that a free end of the first lever moves closer to the mounting bracket as the first lever pivots about the first axis from a rest position to an operated position. The adjustment arrangement adjusts the rest position of the first lever relative to the mounting bracket around the second operating axis.

14 Claims, 9 Drawing Sheets

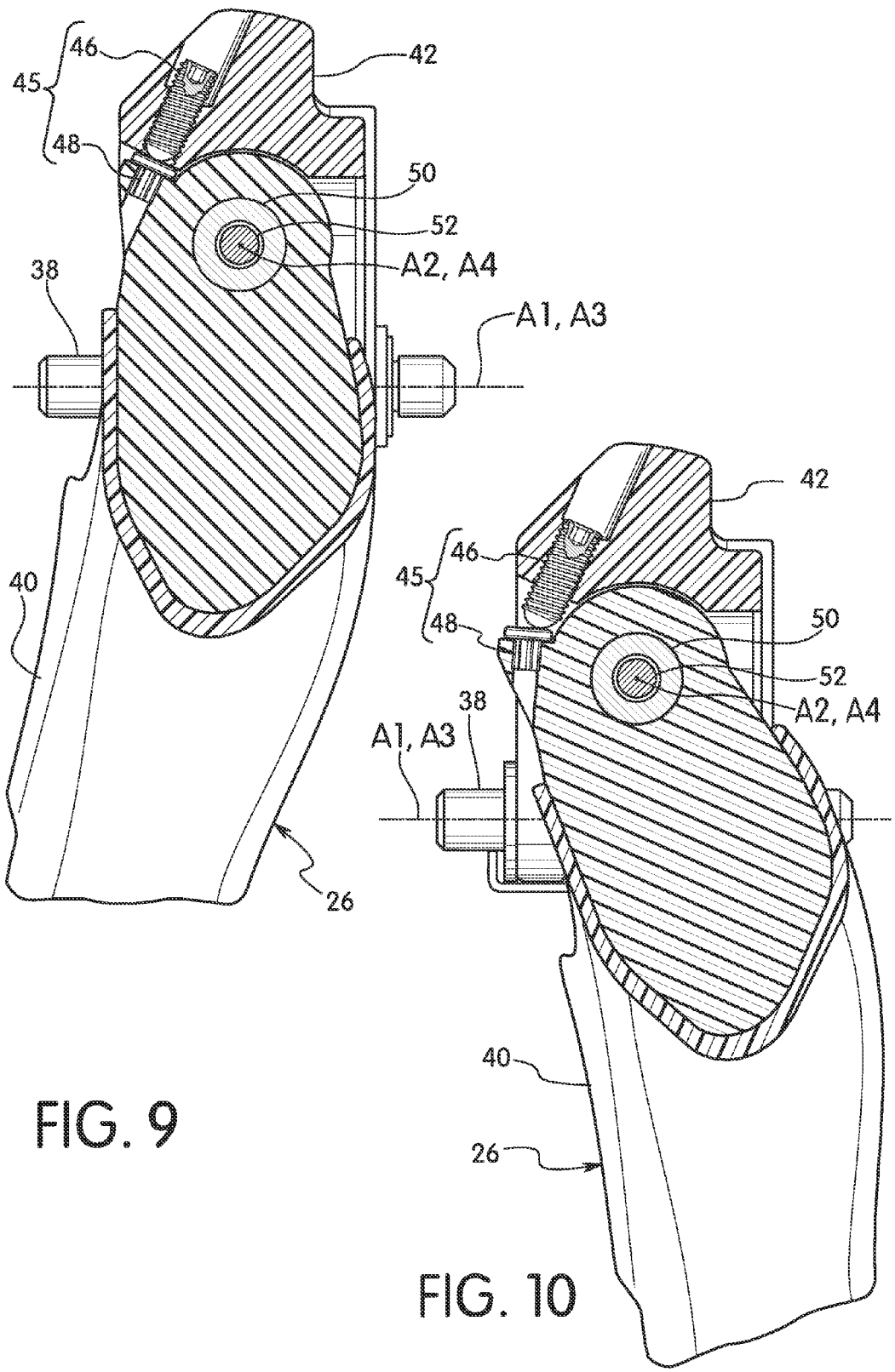

US 9,090,303 B2

BICYCLE CONTROL DEVICE

BACKGROUND

1. Field of the Invention

This invention generally relates to a bicycle control device. More specifically, the present invention relates to a bicycle control device having an adjustment arrangement for adjusting a rest position of an operating lever.

2. Background Information

Bicycle control devices are usually provided on a bicycle for a rider to operate various bicycle components such as operating brakes and changing gears. The bicycle control devices that are used for changing gears are often called shifters. Most mechanical shifters use a control cable that connects the shifter to a gear changing device for shifting the gear changing device between gears. Some shifters use a single operating lever to perform both upshifting operations and downshifting operations, while other shifters use a first operating lever to perform upshifting operations and a second operating lever to perform downshifting operations. Also some shifters integrate braking into one of the operating levers. In the case of a road bicycle with a dropdown handlebar, shifters that perform a dual function of shifting and braking are sometimes referred to as a brifter. In some cases, a brake lever that is integrated into to the shifter such that the brake lever has the dual function. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

Generally, the present disclosure is directed to various features of a bicycle control device. In one feature, a bicycle control device is provided in which a rest position of the lever is adjustable. In this feature, the bicycle control device is provided that comprises a mounting bracket, a first lever and an adjustment arrangement. The first lever is pivotally arranged relative to the mounting bracket about a first-axis and about a second axis being non-parallel to the first axis. The first lever is configured relative to the mounting bracket such that a free end of the first lever moves closer to the mounting bracket as the first lever pivots about the first axis from a rest position to an operated position. The adjustment arrangement adjusts the rest position of the first lever relative to the mounting bracket around the second operating axis.

Other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure:

FIG. 9 is a partial cross sectional view of a portion of the right bicycle control device illustrated in FIGS. 1 to 7 as seen along section line 9-9 of FIG. 8;

FIG. 10 is a partial cross sectional view, similar to FIG. 9, of a portion of the right bicycle control device illustrated in FIGS. 1 to 8, but with the setting screw fay extends from the support portion;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
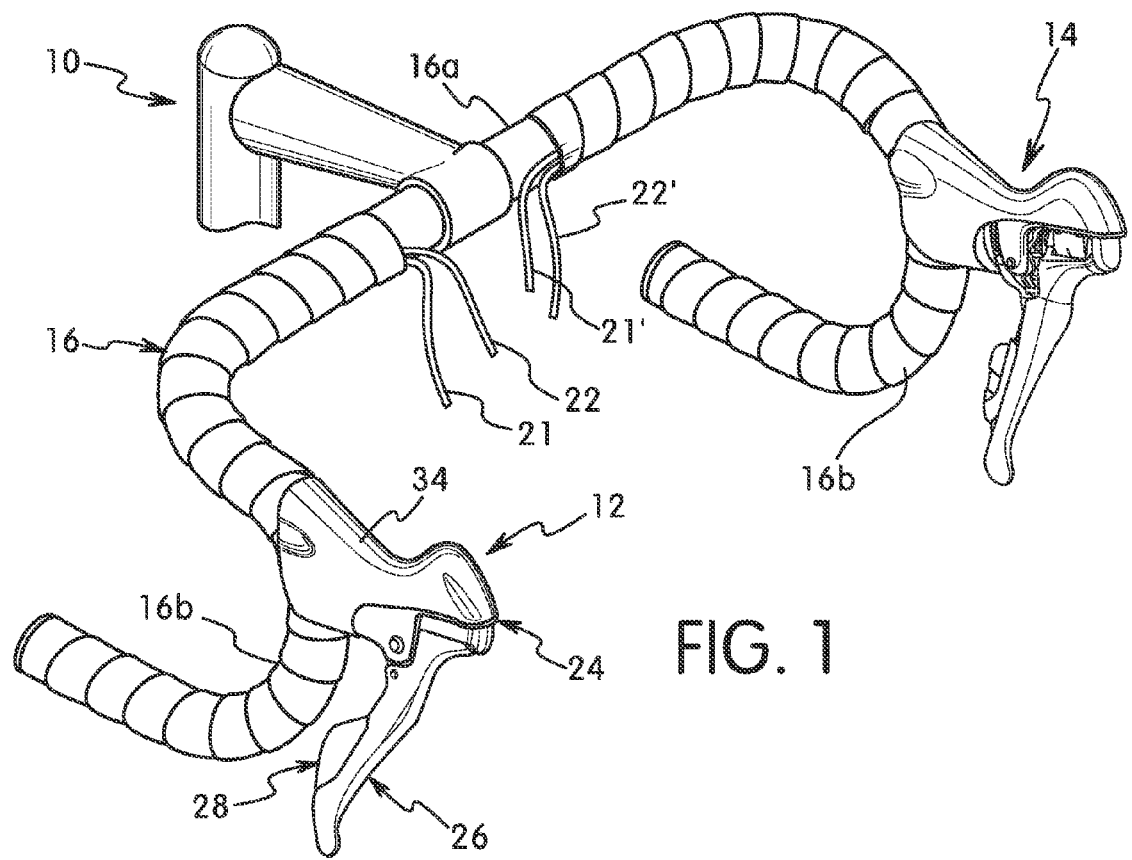
FIG. 1 is a front perspective view of a portion of a bicycle equipped with a pair of bicycle control devices coupled to a drop type handlebar in their installed positions in accordance with one illustrative embodiment.

Referring initially to FIG. 1, a portion of a bicycle 10 that is equipped with a pair of bicycle control devices 12 and 14 is illustrated in accordance with one illustrative embodiment. The bicycle control devices 12 and 14 are mounted on a drop down handlebar 16 in accordance with the illustrated embodiment as seen in FIG. 1. The drop down handlebar 16 typically includes a straight cross portion 16a and a pair of downwardly curved portions 16b. The straight cross portion 16a connects upper ends of the downwardly curved portions 16b. The bicycle control devices 12 and 14 are mounted to the downwardly curved portions 16b of the drop down handlebar 16.

The bicycle control device 12 is a right hand side control device operated by the rider's right hand to operate a first brake device (not shown) and a first gear shifting device (e.g., a cable operated rear derailleur). The bicycle control device 14 is a left hand side control device operated by the rider's left hand to operate a second brake device (not shown) and a second gear shifting device e.g., a cable operated front derailleur). The first and second gear shifting devices are part of a conventional bicycle driving system that is used to shift a bicycle chain for changing speeds of the drive train in a relatively conventional manner.

In the illustrated embodiment, the bicycle control device 12 is operatively coupled to a brake device via a brake control cable 21 and to a gear shifting device via a shift control cable 22. In the illustrated embodiment, the bicycle control device 14 is operatively coupled to a brake device via a brake control cable 21' and to a gear shifting device via a shift control cable 22'.

Figure 2:
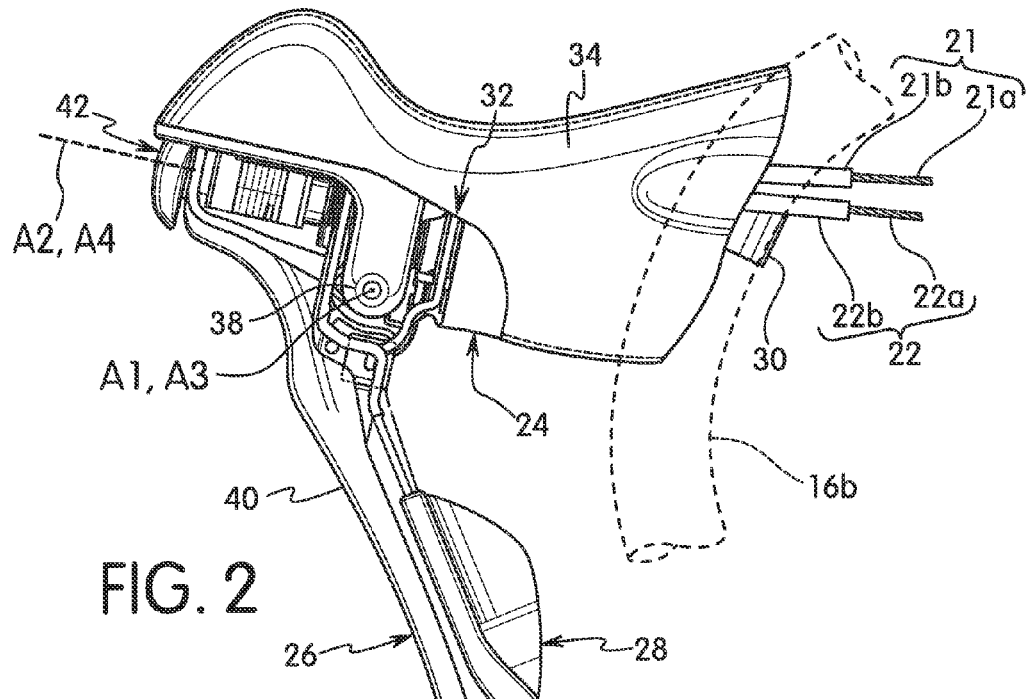
FIG. 2 is an inside elevational view of the right bicycle control device illustrated in FIG. 1 with the first (brake/shift) operating lever and the second (release) operating lever in their rest (non-operating) positions.
Figure 3:
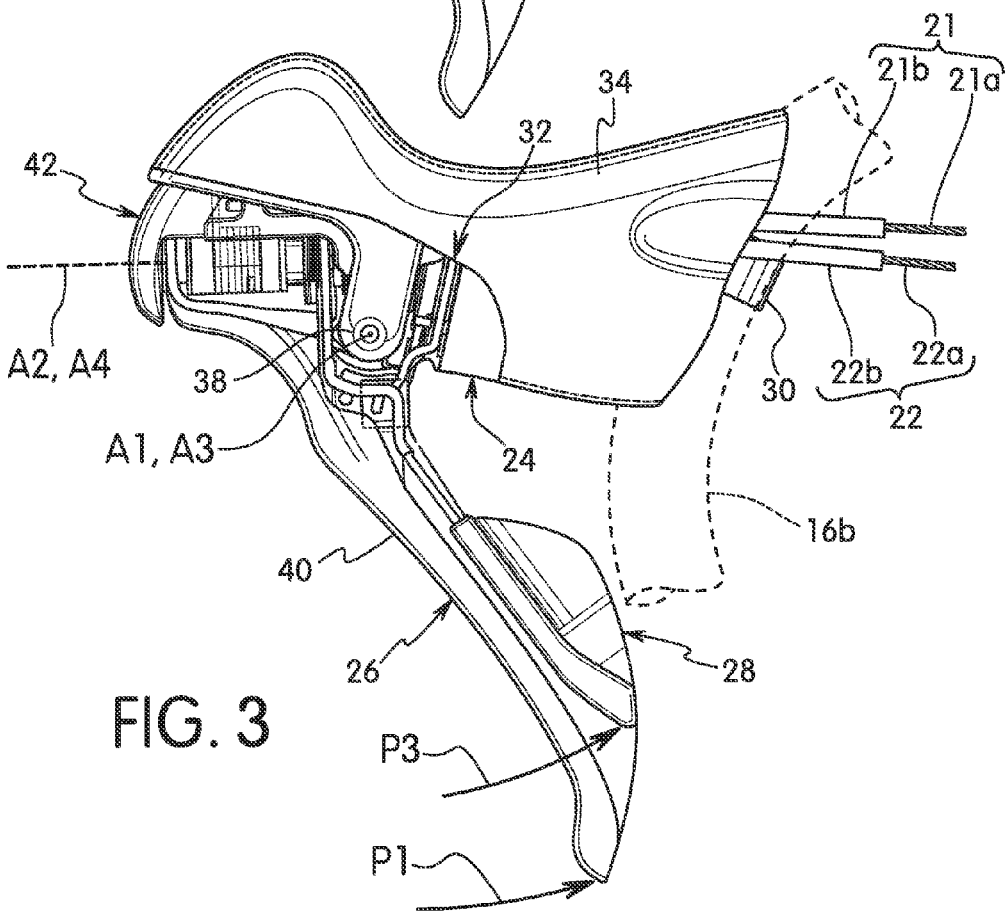
FIG. 3 is an inside elevational view of the right bicycle control device illustrated in FIGS. 1 and 2 with the first (brake/shift) operating lever pivoted to a braking (operated) position.

As seen in FIGS. 2 and 3, preferably, the control cables 21 and 22 are conventional bicycle operating cables that have an outer case covering an inner wire. In other words, each of the control cables 21 and 22 are Bowden type cables basically include an inner wire slidably received within an outer case. For example, as seen in FIG. 3, the brake control cable 21 has an inner wire 21a with an outer case 21b covering the inner wire 21a, while the shift control cable 22 has an inner wire 22a with an outer case 22b covering the inner wire 22a. The inner wire 21a constitutes a connecting member that operatively connects the bicycle control device 12 to the first brake device for applying a braking force to a wheel in response to operation of the bicycle control device 12 as explained below. The inner wire 22a constitutes a connecting member that operatively connects the bicycle control device 12 to the first gear shifting device for shifting the corresponding gear shifting device in response to operation of the bicycle control device 12 as explained below.

While the bicycle control devices 12 and 14 are illustrated as bicycle control device that combine both shifting and braking using Bowden type cables, the bicycle control devices 12 and 14 are not limited to a bicycle control device that combine both shifting and braking using Bowden type cables. For example, the bicycle control devices 12 and 14 can be configured for performing only shifting or braking. Also the bicycle control devices 12 and 14 can be configured for performing braking using a hydraulic operating unit. Moreover, instead of using Bowden type cables for shifting, the bicycle control devices 12 and 14 can be to operate electrical switches.

In the illustrated embodiment, as seen in FIGS. 2 and 3, the bicycle control device 12 basically includes a mounting bracket 24, a first operating lever 26 and a second operating lever 28. In the illustrated embodiment, the first operating lever 26 and the second operating lever 28 are trigger type levers that are biased to the rest positions in a conventional manner. The term "rest position" as used herein refers to a state in which the part (e.g., the first operating lever 26 and the second operating lever 28) remains stationary without the need of a user holding the part in that state corresponding to the rest position.

The mounting bracket 24 is provided with a handlebar clamp 30 for fixedly mounting the bicycle control device 12. The handlebar clamp 30 constitutes a handlebar mounting structure that is at a rear end of the mounting bracket 24 for mounting to one of the downwardly curved portions 16b of the drop down handlebar 16. Thus, the mounting bracket 24 is a stationary member when mounted to the handlebar 16 by the handlebar clamp 30. Since the mounting bracket 24 is fixed to the drop down handlebar 16 by the handlebar clamp 30, the mounting bracket 24 constitutes a fixed member with respect to the drop down handlebar 16. The handlebar clamp 30 is preferably a conventional band clamp or similar structure that is used in a road shifter for gripping the drop down handlebar 16. Since the handlebar clamp 30 can be any suitable mounting structure, the handlebar clamp 30 will not be discussed or illustrated in detail herein.

Figure 4:
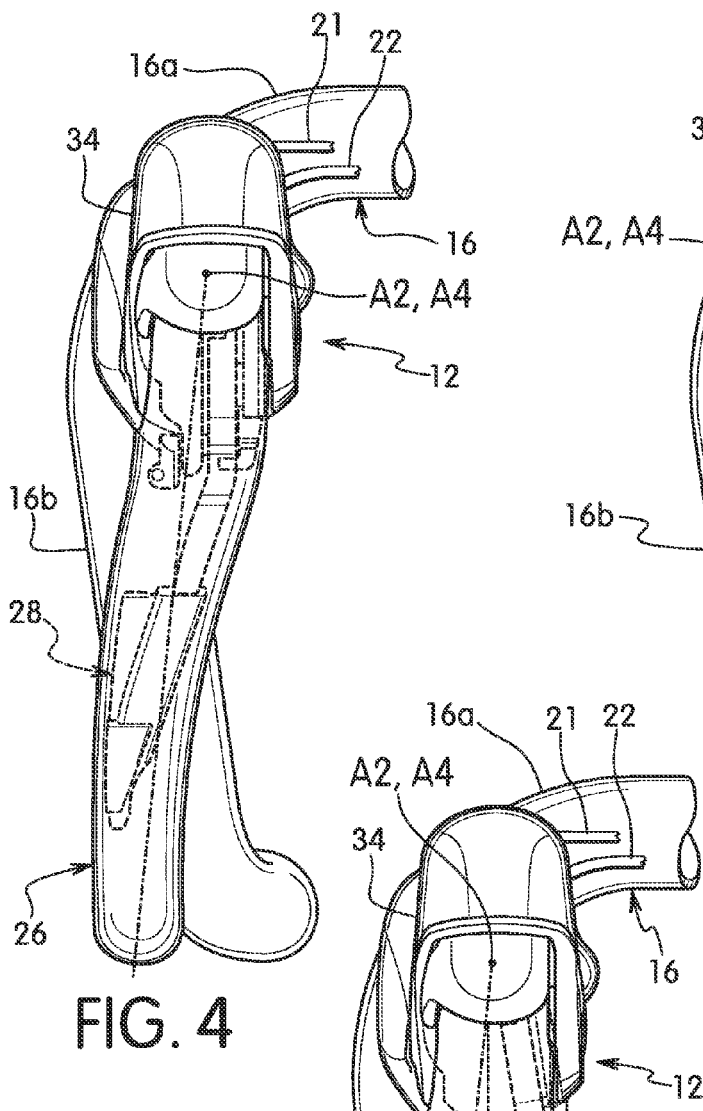
FIG. 4 is a front elevational view of the right bicycle control device illustrated in FIGS. 1 to 3 with the first (brake/shift) operating lever and the second (release) operating lever in their rest positions.
Figure 5:
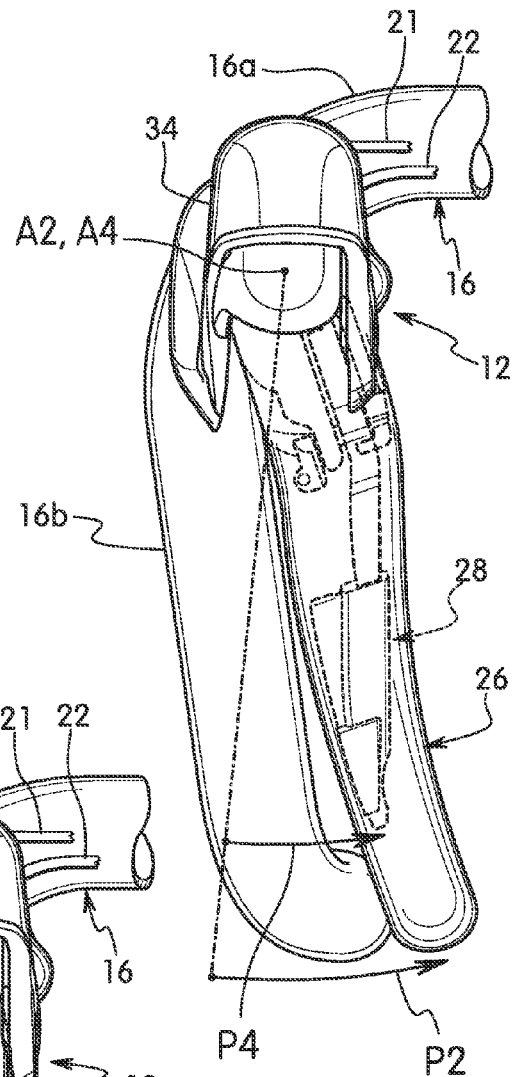
FIG. 5 is a front elevational view of the right bicycle control device illustrated in FIGS. 1 to 4 in which the first (brake/shift) operating lever has been operated (i.e., pivoted) to an operated position with the second (release) operating lever being moved by the first (brake/shift) operating lever.
Figure 6:
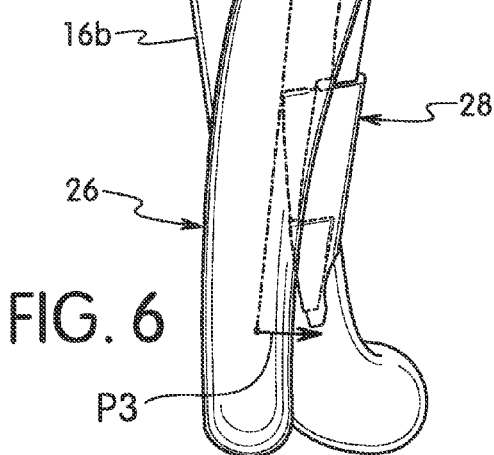
FIG. 6 is a front elevational view of the right bicycle control device illustrated in FIGS. 1 to 5 in which the first (brake/shift) operating lever is in the rest position and the second (release) operating lever has been operated pivoted) to an operated position.

In the illustrated embodiment, the bicycle control device 12 is further provided with a shift unit 32, which is disposed an interior space or internal cavity of the mounting bracket 24. The first and second operating levers 26 and 28 are operatively coupled to the shift unit 32 for performing shifting operations by pulling and releasing the inner wire 22a relative to the mounting bracket 24. Referring to FIGS. 4 to 6, the movements of the first and second operating levers 26 and 28 are illustrated for shifting the shift unit 32. In other words, the first and second operating levers 26 and 28 are examples of user operated levers that are used for operating the shift unit 32 as discussed below. In particular, the first operating lever 26 and the second operating lever 28 are both pivotally mounted with respect to the mounting bracket 24 to operate the shift unit 32. In the illustrated embodiment, the first operating lever 26 is operated relative to the mounting bracket 24 to perform a cable pulling operation, while the second operating lever 28 is pivotally mounted relative to the mounting bracket 24 to perform a cable releasing operation.

Basically, the mounting bracket 24 constitutes a base member that basically supports the first and second operating levers 26 and 28 and the shift unit 32 of the bicycle control device 12. Typically, the mounting bracket 24 is made of a rigid, hard plastic material, since riders sometimes grip the mounting bracket 24 and lean on the mounting bracket 24 during riding. It is desirable to provide a comfortable feeling for the rider's hand white the rider is gripping the mounting bracket 24. Thus, the mounting bracket 24 has a rigid main body that is covered with a soft outer elastomeric grip cover 34. The grip cover 34 partially covers the mounting bracket 24 as seen in FIGS. 2 and 3. In particular, the grip cover 34 is stretched over a gripping portion of the mounting bracket 24. The precise construction of the mounting bracket 24 depends on the construction of the shift unit 32, which can be a variety of types such a cable operated one as shown or an electrical one (not shown). The mounting bracket 24 is sometimes formed as a one-piece member, while in other cases, the mounting bracket 24 is formed a rigid main body part and one or more panel parts. Since a variety of shift units can be used for the shift unit 32 in the bicycle control device 12, the precise construction of the mounting bracket 24 will not be discussed herein.

As seen in FIGS. 2 to 6, the first operating lever 26 is used to perform both a braking operation and a shifting operation (e.g., a cable pulling or winding operation), while the second operating lever 28 is only used to perform a shifting operation (e.g., a cable releasing or unwinding operation). Thus, the first operating lever 26 constitutes a brake/shift operating lever, while the second operating lever 28 constitutes a shift operating lever. FIGS. 2 and 3 illustrate a braking operation being performed by the first operating lever 26, while FIGS. 4 and 5 illustrate a shifting operation being performed by the first operating lever 26. FIGS. 2 and 4 illustrate the first operating lever 26 in the rest position, while FIGS. 3 and 5 illustrate the first operating lever 26 in an operated position. The first operating lever 26 moves the second operating lever 28 as the first operating lever 26 is operated to perform a shifting operation as seen in FIG. 5. However, the first operating lever 26 remains stationary as the second operating lever 28 is operated to perform a shifting operation as seen in FIG. 6.

In the illustrated embodiment, the first operating lever 26 is pivotally arranged relative to the mounting bracket 24 to pivot about a first operating axis A1 between a rest position and a first operating position along a first operating path P1 (FIG. 3) for performing a braking operation. The first operating lever 26 is configured relative to the mounting bracket 24 such that a free end of the first operating lever 26 moves closer to the mounting bracket 24 as the first operating lever 26 pivots about the first operating axis A1 from a rest position (FIG. 2) to an operated position (FIG. 3).

Figure 7:
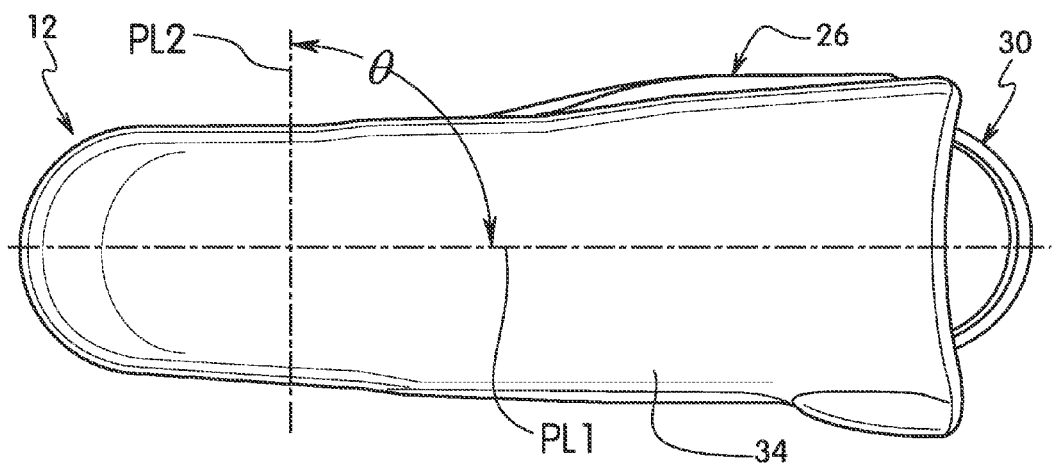
FIG. 7 is a top plan view of the right bicycle control device illustrated in FIGS. 1 to 7 with movement planes of the operating levers being illustrated.

As seen in FIG. 3, the first operating lever 26 is pivotally mounted relative to the mounting bracket 24 by a pivot pin 38 mounted to the mounting bracket 24. The pivot pin 38 defines the first operating axis A1 that extends transverse to the lateral surfaces of the mounting bracket 24 to perform a braking operation. Thus, the first operating axis A1 constitutes a brake pivot axis, and the first operating path P1 constitutes a non-shift operating path. This pivotal movement of the first operating lever 26 from the rest position to the braking position along the first operating path P1 pulls the inner wire 21a of the brake cable 21 to operate a brake device (not shown). Thus, the first operating lever 26 functions as a brake lever. This pivotal movement of the first operating lever 26 defines a first (braking) plane PL1 of the first operating lever 26, which is illustrated in FIG. 7 and discussed below.

In the illustrated embodiment, as seen in FIGS. 2 and 3, the first operating lever 26 includes a lever portion 40 and a support portion 42. The support portion 42 is pivotally attached to the mounting bracket 24 by the pivot pin 38 to pivot around the first operating axis A1. The lever portion 40 is pivotally supported on the support portion 42 around a second operating axis A2 as discussed below. The second operating lever 28 is pivotally mounted on the support portion 42 such that the second operating lever 28 is pivotally arranged relative to the mounting bracket 24 about a third operating axis A3. Thus, the second operating lever 28 is configured relative to the mounting bracket 24 such that a free end of the second operating lever 28 moves closer to the mounting bracket 24 as the second operating lever 28 pivots about the third operating axis A3 from the rest position (FIG. 2) to the operated position (FIG. 3). Here, in the illustrated embodiment, the first operating axis A1 of the first operating lever 26 corresponds to the third operating axis A3 of the second operating lever 28. In other words, the first and third operating axes A1 and A3 are both formed by the pivot pin 38 and thus coincident in the illustrated embodiment. Accordingly, the third operating path P3 of the second operating lever 28 is parallel to the first operating path P1 of the first operating lever 26. However, the second operating lever 28 could be mounted on an axis that is offset from the first operating axis A1. For example, it will be apparent from this disclosure that the second operating lever could be mounted in a manner similar to the release lever of the U.S. Pat. No. 5,400,675 to Nagano (assigned to Shimano, Inc).

As seen in FIGS. 4 and 5, the first operating lever 26 is pivotally mounted relative to the mounting bracket 24 perform a shifting operation (e.g., cable pulling operation). To perform a cable pulling operation, the first operating lever 26 is pivotally arranged relative to the mounting bracket 24 to pivot about the second operating axis A2 between a rest position (FIG. 4) and a second operating position (FIG. 5) along a second operating path P2. This pivotal movement of the first operating lever 26 from the rest position to the shift operated position pulls the inner wire 22a of the shift cable 22. Thus, the first operating lever 26 functions as a cable pulling lever. In the illustrated embodiment, the second operating path P2 is non-parallel to the first operating path P1.

Accordingly, the first operating lever 26 is operatively coupled to the shift unit 32 to operate the bicycle gear changing device to any one of a plurality of gear positions in response to pivotal movement of the first operating lever 26 around the second operating axis A2. In the illustrated embodiment, the second operating axis A2 is non-parallel with respect to the first operating axis A1. Thus, the first operating lever 26 pivots relative to the mounting bracket 24 along a second (shifting) plane PL2 that is transverse to the first (braking) plane PL1 of the first operating lever 26 as seen in FIG. 7. Specifically, the rider pivots the first operating lever 26 about the second operating axis A2 in a direction towards a bicycle longitudinal center plane for shifting, and the rider pivots the first operating lever 26 about the first operating axis A1 in a direction generally parallel to the bicycle longitudinal center plane for braking. When the rider pivots the first operating lever 26 about the first operating axis A1, the second operating lever 28 moves with the first operating lever 26 along the first (braking) plane PL1 since the second operating lever 28 is supported on the support portion 42. When the rider pivots the first operating lever 26 about the second operating axis A2, a contact member 40a of the lever portion 40 contacts the second operating lever 28 such that the second operating lever 28 moves along with the first operating lever 26 without the second operating lever 28 operating the shift unit 32 as explained below.

As seen in FIGS. 4 and 6, the second operating lever 28 is operatively coupled to the shift unit 32 for performing shifting operations (i.e., cable releasing operations). FIG. 4 illustrates the second operating lever 28 in the rest position, while FIG. 6 illustrates the second operating lever 28 in a shift operated position. In particular, the second operating lever 28 is pivotally mounted on the lever portion 40 of the first operating lever 26 such that the second operating lever 28 pivots relative to the first operating lever 26 about a fourth operating axis A4 (see FIGS. 4 and 5) between the rest position and the shifting position. However, when the rider pivots the first operating lever 26 about the second operating axis A2 and the contact member 40a of the lever portion 40 moves the second operating lever 28, the second operating lever 28 moves along with the first operating lever 26 without the second operating lever 28 operating the shift unit 32 because the first operating lever 26 prevents the second operating lever 28 from engaging the shift unit 32.

Accordingly, the second operating lever 28 is operatively coupled to the shift unit 32 to operate a bicycle gear changing device to any one of a plurality of gear positions in response to pivotal movement of the second operating lever 28 around the fourth axis A4. Here, in the illustrated embodiment, the second operating axis A2 of the first operating lever 26 corresponds to the fourth operating axis A4 of the second operating lever 28. In other words, the second and fourth operating axes A2 and A4 are coincident shift pivot axes, and thus, non-parallel to the third operating axis A3 of the second operating lever 28 in the illustrated embodiment.

In the illustrated embodiment, the second operating lever 28 only performs shifting operations. The first operating lever 26 remains stationary or at least substantially stationary as the second operating lever 28 is pivoted about the fourth operating axis A4 so that only the second operating lever 28 is performing a shifting operation. As mentioned above, the first operating lever 26 contacts the second operating lever 28 during pivotal movement of the first operating lever 26 about the second operating axis A2 to perform a shifting operation. However, the second operating lever 28 does not operate the shift unit 32 when the first operating lever 26 is pivoted about the second operating axis A2 to perform a shifting operation.

In the illustrated embodiment, the second operating lever 28 releases the inner wire 22a from the shift unit 32 when the second operating lever 28 is pivoted about the fourth operating axis A4 in a direction towards the center longitudinal plane of the bicycle 10. Thus, the second operating lever 28 constitutes as a cable releasing lever.

Preferably, as seen in FIG. 7, the first operating lever 26 moves along the first plane PL1 as the first operating lever 26 is pivoted around the first operating axis A1, the second operating lever 28 moves along a second plane PL2 as the second operating lever 28 is pivoted around the fourth axis A4. The first and second planes PL1 and PL2 form an angle θ therebetween in a range of fifty degrees to ninety degrees. In the illustrated embodiment, as seen in FIG. 7, the angle θ is ninety degrees. It will be apparent from this disclosure that the first and second operating levers 26 and 28 are not entirely disposed within the first and second planes PL1 and PL2, respectively. Rather, as the first and second operating levers 26 and 28 are pivoted around the first and second operating axes A1 and A2, the first and second planes PL1 and PL2 are defined by the movement of a part of each of the first and second operating levers 26 and 28.

Figure 8:
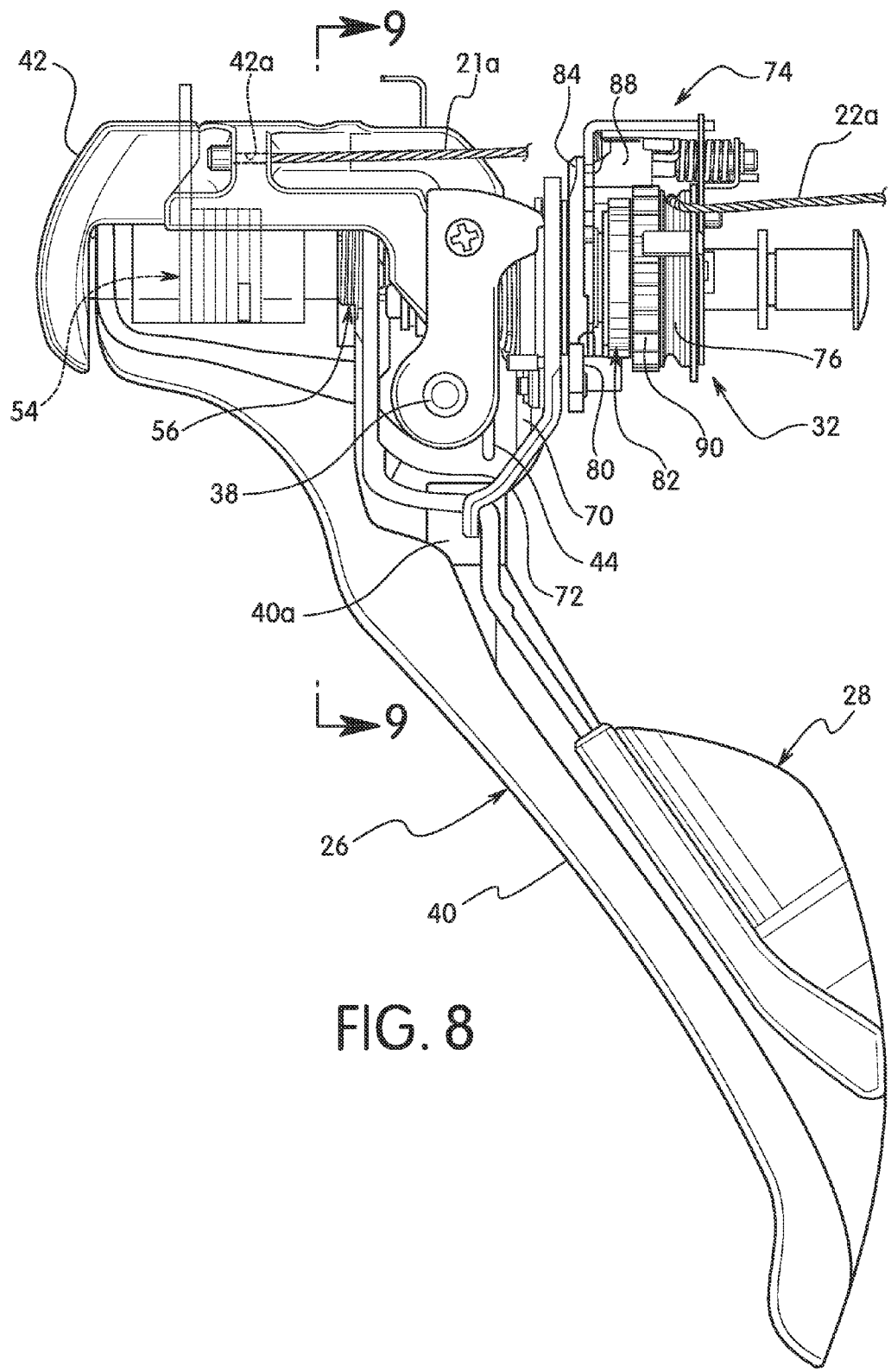
FIG. 8 is an inside elevational view of the right bicycle control device illustrated in FIGS. 1 to 6 with selected parts (e.g., the bracket) have been removed to show the shift unit and other internal parts.
Figure 11:
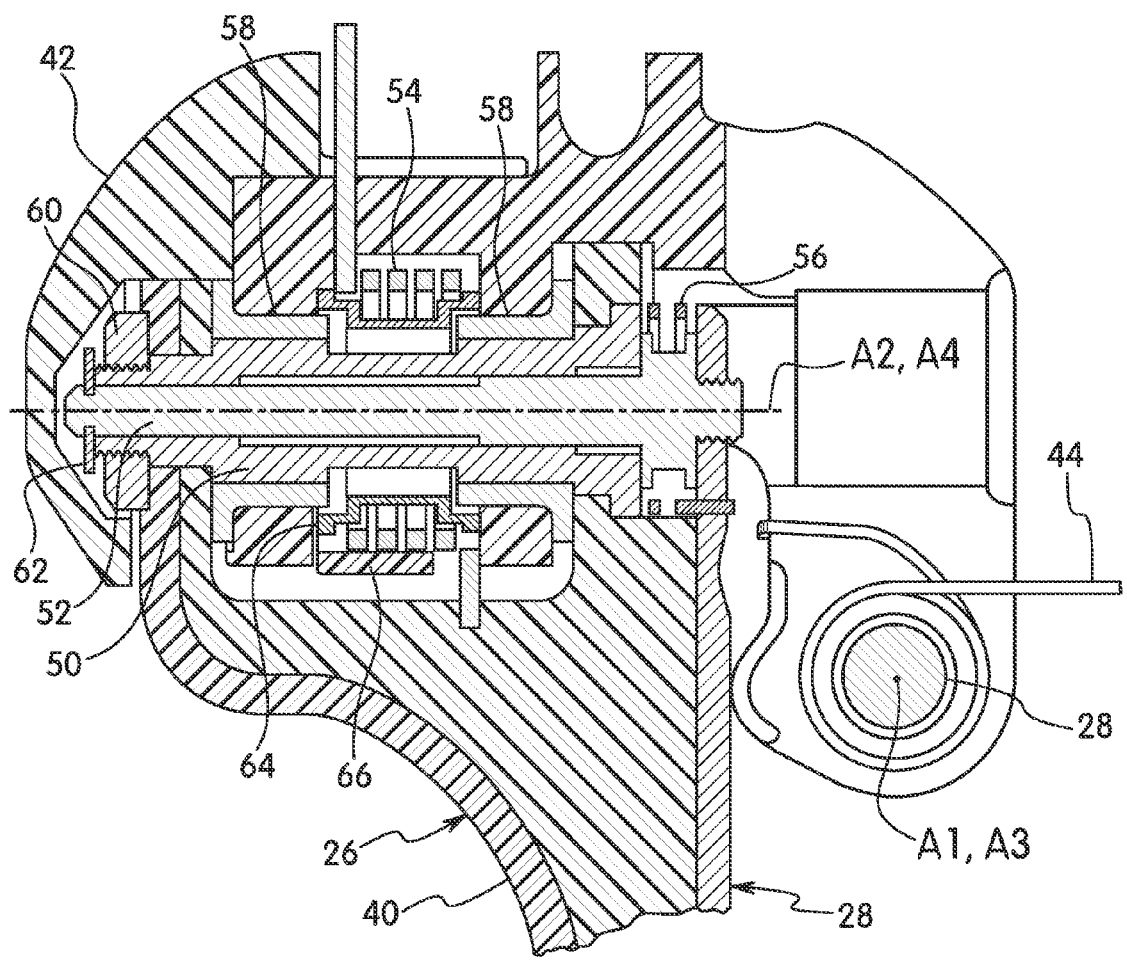
FIG. 11 is a partial cross sectional view of a portion of the right bicycle control device illustrated in FIGS. 1 to 8 as taken longitudinally along the center of the shift operating axes of the first and second operating levers with the bracket removed.

As seen in FIG. 8, the support portion 42 has a brake cable attachment structure 42a for attaching the inner wire 21a of the brake control cable 21. Thus, the brake cable attachment structure 42a pulls the inner wire 21a of the brake control cable 21 as the first operating lever 26 pivots the support portion 42 about the first operating axis A1 that is defined by the pivot pin 38 from the rest position (FIG. 2) to the braking position (FIG. 3). As seen in FIG. 11, a biasing element 44 is provided on the pivot pin 38 for providing a biasing force between the mounting bracket 24 and the support portion 42. The biasing element 44 is arranged for biasing the support portion 42 and the first and second operating levers 26 and 28 to their rest positions (FIG. 2) in a conventional manner. In the illustrated embodiment, the biasing element 44 is a torsion spring with its coiled portion disposed on the pivot pin 38 and its first and second free ends contacting the mounting bracket 24 and the support portion 42, respectively.

As seen in FIGS. 9 and 10, the first operating lever 26 is provided with a lever adjustment arrangement 45 that adjusts the rest position of the lever portion 40 of the first operating lever 26 relative to the mounting bracket 24 around the second operating axis A2. Since the second operating lever 28 is arranged to move with the lever portion 40 as the lever portion 40 moves from the rest position to the operated position, the rest position of the second operating lever 28 is also adjusted by the adjustment arrangement 45.

The adjustment arrangement includes a setting screw 46 that is screwed into the support portion 42 for adjusting the rest position of the lever portion 40 of the first operating lever 26 around the second operating axis A2. Optionally, the adjustment arrangement further includes an abutment 48 that is attached to the lever portion 40 in a removable manner. The setting screw 46 contacts the abutment 48 on the lever portion 40. By screwing the setting screw 46 clockwise or counterclockwise, the setting screw 46 selectively contacts and adjusts the rest position of the first operating lever 26 relative to the mounting bracket 24 around the second operating axis A2. The setting screw 46 can be screwed out of contact from the abutment 48 on the lever portion 40 to attain a fully unadjusted orientation of the first operating lever 26. Of course, the abutment 48 can be removed such that the rest position of the first operating lever 26 will be further to the left as viewed in FIG. 9. The size of the abutment 48 can also be varied to change the rest position of the first operating lever 26 relative to the mounting bracket 24 around the second operating axis A2.

As seen in FIGS. 9 to 11, the first operating lever 26 is pivotally mounted to the support portion 42 on a first pivot axle 50 for pivotal movement about the second operating axis A2. In the illustrated embodiment, the second operating axis A2 corresponds to a shift pivot axis defined by the first pivot axle 50. The second operating lever 28 is pivotally mounted to the support portion 42 on a second pivot axle 52 for pivotal movement about the fourth operating axis A4. In the illustrated embodiment, the fourth operating axis A4 corresponds to a shift pivot axis defined by the second pivot axle 52. The second pivot axle 52 is disposed inside a center bore of a tubular shaft of the first pivot axle 50. Thus, the first and second operating axes A1 and A2 defined by the first and second pivot axles 50 and 52 are coincident in the illustrated embodiment. However, the first and second pivot axles 50 and 52 can be configured such that the first and second operating axes A1 and A2 are not coincident, if needed and/or desired.

As seen in FIG. 11, a first biasing member 54 is provided between the first operating lever 26 and the support portion 42 for biasing the first operating lever 26 to its rest position. The first biasing member 54 biases the first operating lever 26 relative to the support portion 42 about the second operating axis A2 in a direction away from the center plane of the bicycle. In the illustrated embodiment, the first biasing member 54 is a torsion spring that is disposed on a center section of the tubular shaft of the first pivot axle 50. More specifically, the first biasing member 54 has a first end that is disposed in a hole of the first operating lever 26, and a second end that is disposed in a hole of the support portion 42. The first biasing member 54 has its coiled portion disposed on the tubular shaft of the first pivot axle 50.

Similarly, as seen in FIG. 11, a second biasing member 56 is provided between the second operating lever 28 and the support portion 42 for biasing the second operating lever 28 to its rest position. The second biasing member 56 is arranged for biasing the second operating lever 28 relative to the first operating lever 26 about the second operating axis A2 in a direction away from the center plane of the bicycle. In the illustrated embodiment, the second the biasing member 56 is a torsion spring that is disposed on a lever attachment portion of the second pivot axle 52 that extends out of one end of the tubular shaft of the first pivot axle 50. The second operating lever 28 is fixedly attached to the lever attachment portion such that the second operating lever 28 and the second pivot axle 52 rotate as a unit within the tubular shaft of the first pivot axle 50. In the illustrated embodiment, as seen in FIG. 11, the second the biasing member 56 is threaded onto the lever attachment portion 52a of the second pivot axle 52. The second biasing member 56 has a first end that is disposed in a hole of the second operating lever 28, and a second end that contacts the support portion 42. The second biasing element 56 has its coiled portion disposed on the lever attachment portion of the second pivot axle 52.

The first and second pivot axles 50 and 52 will now be discussed in more detail. The first pivot axle 50 is provided with a pair of bushings 58 such that the flanges of the support portion 42 pivotally supports the tubular shaft of the first pivot axle 50 via the bushings 58. Thus, the first pivot axle 50 and the first operating lever 26 pivot together as a unit. In the illustrated embodiment, as seen in FIG. 11, the tubular shaft has an enlarged head at one end and an external thread at the other end. The external thread threadedly receives a nut 60. Thus, the first pivot axle 50 functions as a fastener for attaching the first operating lever 26 to the support portion 42. Since the biasing element 44 biases the support portion 42 to a stationary rest position with respect to the mounting bracket 24, the first pivot axle 50 and the first operating lever 26 pivot together as a unit with respect to the mounting bracket 24.

As mentioned above, the second operating lever 28 is attached to the second pivot axle 52, which is pivotally supported within the tubular shaft of the first pivot axle 50. The second pivot axle 52 has a free end with an annular groove for receiving a clip 62 at the end opposite to the lever attachment portion of the second pivot axle 52. The second pivot axle 52 also has an enlarged head formed adjacent the lever attachment portion of the second pivot axle 52. Thus, the second pivot axle 52 is rotatably retained to the first pivot axle 50 by the clip 62. In this way, the second pivot axle 52 is pivotally supported within the tubular shaft 50a of the first pivot axle 50 for relative pivotal movement with respect to the support portion 42 and the mounting bracket 24.

In the illustrated embodiment, as best seen in FIG. 11, the first biasing member 54 can be provided with a pair of cover members 64 and 66, if needed and/or desired. These cover members 64 and 66 aid in protecting the first biasing member 54 from contamination.

Figure 12:
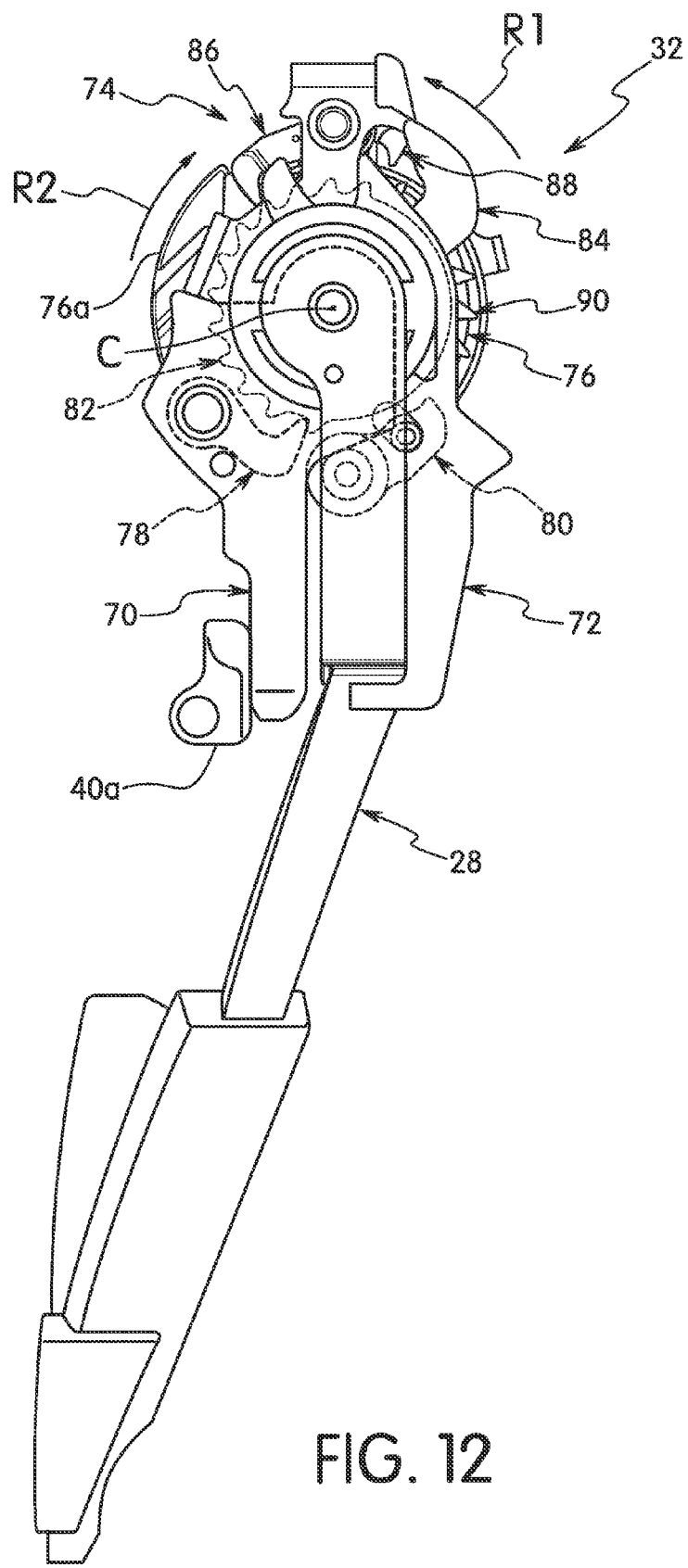
FIG. 12 is a front view of selected parts of the right bicycle control device illustrated in FIGS. 1 to 8 as viewed along the shift operating axes of the first and second operating levers with the bracket removed.
Figure 13:
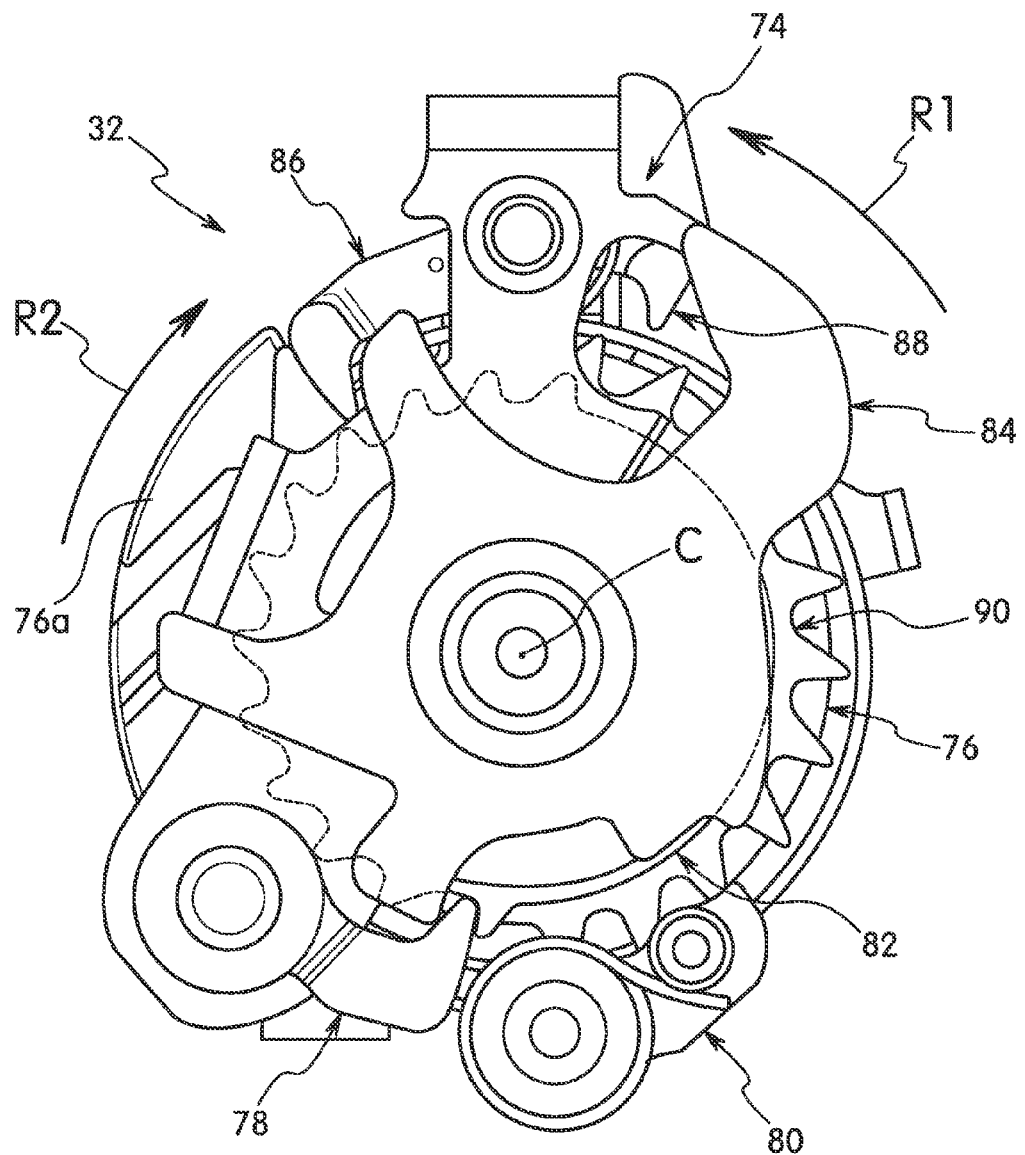
FIG. 13 is a front view of selected parts of the shift unit for the right bicycle control device illustrated in FIGS. 1 to 8 as viewed along the main operating axis of the shift unit.

Referring now to FIGS. 12 and 13, the shift unit 32 will now be briefly discussed. However, as mentioned above, the shift unit 32 is not limited to the construction illustrated herein. Rather, the mounting arrangement of the first and second operating levers 26 and 28 to the mounting bracket 24 can be used with other shift units. Thus, the shift unit 32 will not be discussed in great detail. The shift unit 32 is provided in the mounting bracket 24 and has a pair of input members 70 and 72 extending out of the mounting bracket 24 for being operated by the first and second operating levers 26 and 28. Specifically, the input member 70 is operated by the movement of the first operating lever 26 about the second operating axis A2 towards the bicycle longitudinal center plane for performing a shift operation. The input member 72 is operated by the movement of the second operating lever 28 about the fourth operating axis A4 towards the bicycle longitudinal center plane for performing a shift operation. Thus, the first and second operating levers 26 and 28 are operatively connected to the shift unit 32 by the input members 70 and 72 for performing shifting operations. The input members 70 and 72 constitute shift operating members.

In the illustrated embodiment, the shift unit 32 is a cable operated unit, which typically includes a positioning mechanism 74 that controls the position of a wire take-up member or spool 76. The wire take-up member 76 constitutes one example of a winding member of the shift unit 32. Other parts of the shift unit 32 that move as the inner wire 21a moves can also constitute a winding member of the shift unit 32. The wire take-up member 76 is pivotally mounted relative to the mounting bracket 24, and has a cable attachment structure 76a for attaching a nipple of the inner wire 22a thereto. The first operating lever 26 operates the shift unit 32 such that the wire take-up member 76 pivots in a first pivot direction R1, which corresponds to a cable pulling or winding direction of the wire take-up member 76. The second operating lever 28 operates the shift unit 32 such that the wire take-up member 76 pivots in a second pivot direction R2 of the wire take-up member 76 that is opposite the first pivot direction R1, which corresponds to a cable releasing direction of the wire take-up member 76. The wire take-up member 76 and the input members 70 and 72 are coaxially arranged on a main shift axle of the shift unit 32. The main shift axle of the shift unit 32 defines a main pivot axis C of the shift unit 32 (FIG. 12). The main shift axle of the shift unit 32 pivotally supports the wire take-up member 76 and the input members 70 and 72 to the mounting bracket 24 for rotation on the main pivot axis C by several stationary support braces or plates. The main pivot axis C of the shift unit 32 is parallel to the third and fourth operating axes A3 and A4 in the illustrated embodiment. In the illustrated embodiment, the wire take-up member 76 is biased in the second pivot direction R2 (FIG. 12) by a biasing element such as a coil torsion spring having one end attached to the wire take-up member 76 and the other end attached to one of the stationary support plates.

In the illustrated embodiment, the input member 70 has a winding pawl 78 that is configured and arranged to operate the positioning mechanism 74 such that the wire take-up member 76 pivots in the first pivot direction R1. Thus, operation of the first operating lever 26 causes the wire take-up member 76 to move in the first rotational direction R1 by the winding pawl 78 operating the positioning mechanism 74 for pulling the inner wire 22a. On the other hand, the input member 72 has a release pawl 80 that is configured and arranged to operate the positioning mechanism 74 such that the wire take-up member 76 pivots in the second pivot direction R2. Thus, operation of the second operating lever 28 causes the wire take-up member 76 to move in the second rotational direction R2 by the release pawl 80 operating the positioning mechanism 74 for releasing the inner wire 22a.

In the illustrated embodiment, the positioning mechanism 74 has a winding plate 82, a release plate 84, a positioning pawl 86, a stop pawl 88 and a positioning plate 90. The winding plate 82 and the positioning plate 90 are fixed to the wire take-up member 76 such that they move together as a unit. The winding plate 82 includes a plurality of winding teeth that are selectively engaged by the winding pawl 78 to pivot the wire take-up member 76 in the first pivot direction R1. The positioning plate 90 includes a plurality of positioning teeth that are selectively engaged by the positioning pawl 86 to hold the wire take-up member 76 in a shifted position after the first and second operating levers 26 and 28 are operated and released. The release plate 84 is rotated by the release pawl 80 in the first pivot direction R1 such that the positioning pawl 86 and the stop pawl 88 are selectively engaged and disengaged from the positioning plate 82 to release the positioning plate 90 for movement in the second pivot direction R2.

In the illustrated embodiment, the winding pawl 78 is biased by a biasing element, such as a torsion spring, towards engagement with the winding teeth of the winding plate 82 as seen in the rest position of FIG. 12. Thus, during a winding operation with the first operating lever 26 pivoting about the second operating axis A2, the winding pawl 78 engages one of the winding teeth of the winding plate 82 to rotate the winding plate 82 in the first pivot direction R1. The rotation of the winding plate 82 in the first pivot direction R1 causes the winding teeth of the winding plate 82 to ratchet the positioning plate 90 out of engagement with a currently engaged positioning tooth of the positioning plate 90 and then back into engagement with another positioning tooth of the positioning plate 90 to selectively hold the wire take-up member 76 in a new position. During a winding operation with the first operating lever 26, the first and second operating levers 26 and 28 are configured to cooperate together with the release pawl 80 such that the release pawl 80 is held in a disengaged position with respect to the release plate 84. In this way, when the rider pivots the first operating lever 26 about the second operating axis A2, the abutment 40a of the first operating lever 26 moves the input member 70 which in turn abuts against the input member 72 to move the input member 72. The movement of the input member 70 by the first operating lever 26 results in the second operating lever 28 pivoting about the fourth operating axis A4 without the second operating lever 28 operating the shift unit 32 because an abutment of the input member 70 prevents the release pawl 80 from engaging the shift unit 32.

In the illustrated embodiment, the release pawl 80 is biased by a biasing element, such as a torsion spring, towards engagement with the release plate 84 as seen in the rest position of FIG. 12. During a releasing operation with the second operating lever 28 pivoting about the fourth operating axis A4, the release plate 84 moves the winding pawl 78 to a disengaged position with respect to the winding plate 82. In this way, the release plate 84 is free to rotate in the first pivot direction R1 without moving the input member 70 and the first operating lever 26. Rotation of the release plate 84 in the first pivot direction R1 sequentially operates the stop pawl 88 and then the positioning pawl 86 so that the wire take-up member 76 rotates in the second pivot direction R2 by a biasing force of a biasing element for one shift position.

In understanding the scope of the present invention, the term "comprising" and its derivatives, as used herein, are intended to be open ended terms that specify the presence of the stated features, elements, components, groups, and/or integers, but do not exclude the presence of other unstated features, elements, components, groups, and/or integers. The foregoing also applies to words having similar meanings such as the terms, "including", "having" and their derivatives. As used herein to describe the above embodiment(s), the following directional terms "forward", "rearward", "top", "bottom", "above", "below", "downward", "vertical", "horizontal", "inner", "outer" and "transverse" as well as any other similar directional terms refer to those directions of a bicycle equipped with the bicycle control device on a flat horizontal surface. Accordingly, these terms, as utilized to describe the bicycle control device should be interpreted relative to a bicycle equipped with the bicycle control device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, while a lever adjustment arrangement is illustrated for adjusting a rest position of lever of a road bicycle control device, it will be apparent to those skilled in the art from this disclosure that the lever adjustment arrangement can be adapted to a mountain bicycle control device such as the one disclosed in U.S. Pat. No. 8,181,553 (assigned to Shimano Inc.). Components that are shown directly connected or contacting each other can have intermediate structures disposed between them unless specifically stated otherwise. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
a mounting bracket;
a first lever pivotally arranged relative to the mounting bracket about a first axis to operate a first device and about a second axis to operate a second device, the second axis being non-parallel to the first axis, the first lever being configured relative to the mounting bracket such that a free end of the first lever moves closer to the mounting bracket as the first lever pivots about the first axis from a rest position to an operated position;
an adjustment arrangement configured to adjust the rest position of the first lever relative to the mounting bracket around the second axis without changing a position of the first axis and a position of the second axis relative to the mounting bracket;
a second lever pivotally arranged relative to the mounting bracket about a third axis and about a fourth axis being non-parallel to the third axis, the second lever being configured relative to the mounting bracket such that a free end of the second lever moves closer to the mounting bracket as the second lever pivots about the third axis from a rest position to an operated position; and
a shift unit provided in the mounting bracket and operatively coupled to the second lever, the second lever being operatively coupled to the shift unit to operate a bicycle gear changing device to any one of a plurality of gear positions in response to pivotal movement of the second lever around the fourth axis.

2. The bicycle control device according to claim 1, wherein the mounting bracket has a handlebar clamp, the free end of the first lever moves closer to the handlebar clamp as the first lever pivots about the first axis from the rest position to the operated position.

3. The bicycle control device according to claim 1, wherein the first lever includes a support portion pivotally attached to the mounting bracket around the first axis and a lever portion being pivotally supported on the support portion around the second axis; and
the adjustment arrangement includes a setting screw that is screwed into the support portion and selectively contacts the lever portion to adjust the rest position of the first lever relative to the mounting bracket around the second axis.

4. The bicycle control device according to claim 1, wherein the first lever is operatively coupled to the shift unit to operate the bicycle gear changing device to any one of a plurality of gear positions in response to pivotal movement of the first lever around the second axis.

5. The bicycle control device according to claim 4, wherein the shift unit includes a winding member pivotally mounted relative to the mounting bracket, the first lever operates the shift unit such that the winding member pivots in a first pivot direction, and the second lever operates the shift unit such that the winding member pivots in a second pivot direction being opposite to the first pivot direction.

6. The bicycle control device according to claim 1, wherein the first axis of the first lever corresponds to the third axis of the second lever.

7. The bicycle control device according to claim 1, wherein the second axis of the first lever corresponds to the fourth axis of the second lever.

8. The bicycle control device according to claim 1, wherein the first lever moves along a first plane as the first lever is pivoted around the first axis, the second lever moves along a second plane as the second lever is pivoted around the fourth axis, and the first and second planes form an angle therebetween in a range of fifty degrees to ninety degrees.

9. The bicycle control device according to claim 1, wherein
the first lever pivots the second lever around the third axis as the first lever is pivoted around the first axis.

10. The bicycle control device according to claim 1, wherein
the first lever pivots the second lever around the fourth axis as the first lever is pivoted around the second axis.

11. The bicycle control device according to claim 1, wherein
the first lever remains stationary as the second lever is pivoted around the fourth axis.

12. The bicycle control device according to claim 4, wherein
the first lever includes a brake cable attachment structure that pulls an inner wire of a brake cable as the first lever pivots about the first axis.

13. The bicycle control device according to claim 1, wherein
the first lever includes a brake cable attachment structure that pulls an inner wire of a brake cable as the first lever pivots about the first axis.

14. The bicycle control device according to claim 1, wherein
the adjustment device is configured to pivot the entire first lever about the second axis.

* * * * *